(12) United States Patent
Knych et al.

(10) Patent No.: US 6,565,121 B2
(45) Date of Patent: May 20, 2003

(54) THREE-POINT SEAT BELT SYSTEM (75) Inventors: Andreas Knych, München (DE); Rudolf Meyer, Odelzhausen (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 78 days.

(21) Appl. No.: 09/972,609

(22) Filed: Oct. 8, 2001

(65) Prior Publication Data
US 2002/0130506 A1 Sep. 19, 2002

(30) Foreign Application Priority Data
Mar. 16, 2001 (DE) .......................... 101 12 853

(51) Int. Cl.⁷ ............................................ B60R 22/195
(52) U.S. Cl. ...................... 280/806; 280/807; 280/808; 297/480
(58) Field of Search ................. 280/806, 808, 280/807; 297/480; B60R 22/195

(56) References Cited

U.S. PATENT DOCUMENTS

| | | | |
|---|---|---|---|
| 3,891,271 A * | 6/1975 | Fieni ........................... | 297/470 |
| 3,901,531 A * | 8/1975 | Prochazka .................. | 297/470 |
| 4,008,909 A * | 2/1977 | Otani et al. ................. | 297/470 |
| 4,015,860 A * | 4/1977 | Tisell et al. ................. | 297/480 |
| 4,385,775 A * | 5/1983 | Shimogawa et al. ........ | 280/806 |
| 4,682,791 A * | 7/1987 | Ernst ........................... | 280/806 |
| 4,767,161 A | 8/1988 | Sedlmayr et al. ........... | 297/472 |
| 5,219,207 A * | 6/1993 | Anthony et al. ............. | 297/473 |
| 5,492,368 A * | 2/1996 | Pywell et al. ................ | 280/806 |
| 5,519,997 A | 5/1996 | Specht ......................... | 60/632 |
| 5,558,294 A * | 9/1996 | Sasaki et al. ................ | 242/377 |
| 5,634,664 A * | 6/1997 | Seki et al. ................... | 280/806 |
| 5,704,638 A * | 1/1998 | Lane, Jr. ................... | 280/730.2 |
| 5,743,563 A * | 4/1998 | Juchem et al. .............. | 280/806 |
| 5,845,939 A | 12/1998 | Greiner et al. .............. | 280/806 |
| 5,971,488 A * | 10/1999 | Pedronno et al. ........... | 297/468 |
| 6,179,330 B1 * | 1/2001 | Wier ............................ | 280/806 |
| 6,238,003 B1 * | 5/2001 | Miller et al. ................ | 297/480 |
| 6,382,674 B1 * | 5/2002 | Specht et al. ............... | 280/806 |
| 6,409,212 B1 * | 6/2002 | Wier ............................ | 280/733 |
| 6,447,011 B1 * | 9/2002 | Vollimer ..................... | 280/806 |

FOREIGN PATENT DOCUMENTS

| | | |
|---|---|---|
| DE | 3518121 | 11/1986 |
| DE | 4415467 C1 * | 11/1995 |
| DE | 29606896 | 9/1996 |
| DE | 29922854 U1 * | 5/2000 |
| WO | WO 00/59757 | * 10/2000 |

* cited by examiner

Primary Examiner—Paul N. Dickson
Assistant Examiner—Ruth Ilan
(74) Attorney, Agent, or Firm—Lonnie Drayer (57) ABSTRACT

A three-point seat belt system for a motor vehicle front seat has a belt tightening drive fastened to the front seat. The belt tightening drive engages an anchoring point of the seat belt fastened to the vehicle seat. The drive element of the belt tightening drive is securely connected to a belt webbing part, which derives from the lap belt and is guided through a belt webbing guide fastened to the seat substructure.

11 Claims, 10 Drawing Sheets

THREE-POINT SEAT BELT SYSTEM

FIELD OF THE INVENTION

The present invention relates to a three-point seat belt system for a motor vehicle front seat.

BACKGROUND OF THE INVENTION

A typical three-point seat belt system has three anchoring points. These anchoring points typically comprise an end fitting with which an end of the belt webbing is fastened to the motor vehicle structure. A belt buckle receives a buckle tongue that is slides on the belt webbing. An upper anchoring point, at shoulder height or above the vehicle front seat, is located on the B-pillar, for instance in the form of a belt guide via which the belt webbing extendable across the chest of a seat occupant is guided to a seat belt retractor. With this type of three-point seat belt it is known to retract the belt buckle, which constitutes one of the three anchoring points, using a belt tightening drive to eliminate slack in the belt webbing and to restrain the vehicle occupant in the vehicle seat. The activation of the belt tightening drive occurs during a crash and is triggered by a sensor device. A three-point seat belt system having a belt buckle connected to a belt tightening drive is known, for example, from U.S. Pat. No. 5,519,997.

SUMMARY OF THE INVENTION

There is provided in accordance with the present invention A three-point seat belt system for a motor vehicle front seat comprising a belt tightening drive fastened to the front seat and engages an anchoring point of the seat belt fastened to the vehicle seat, wherein a drive element of the belt tightening drive is securely connected to a belt webbing part that is guided from the lap belt through a belt webbing guide fastened to a seat substructure.

DETAILED DESCRIPTION OF THE INVENTION

Figure 5:
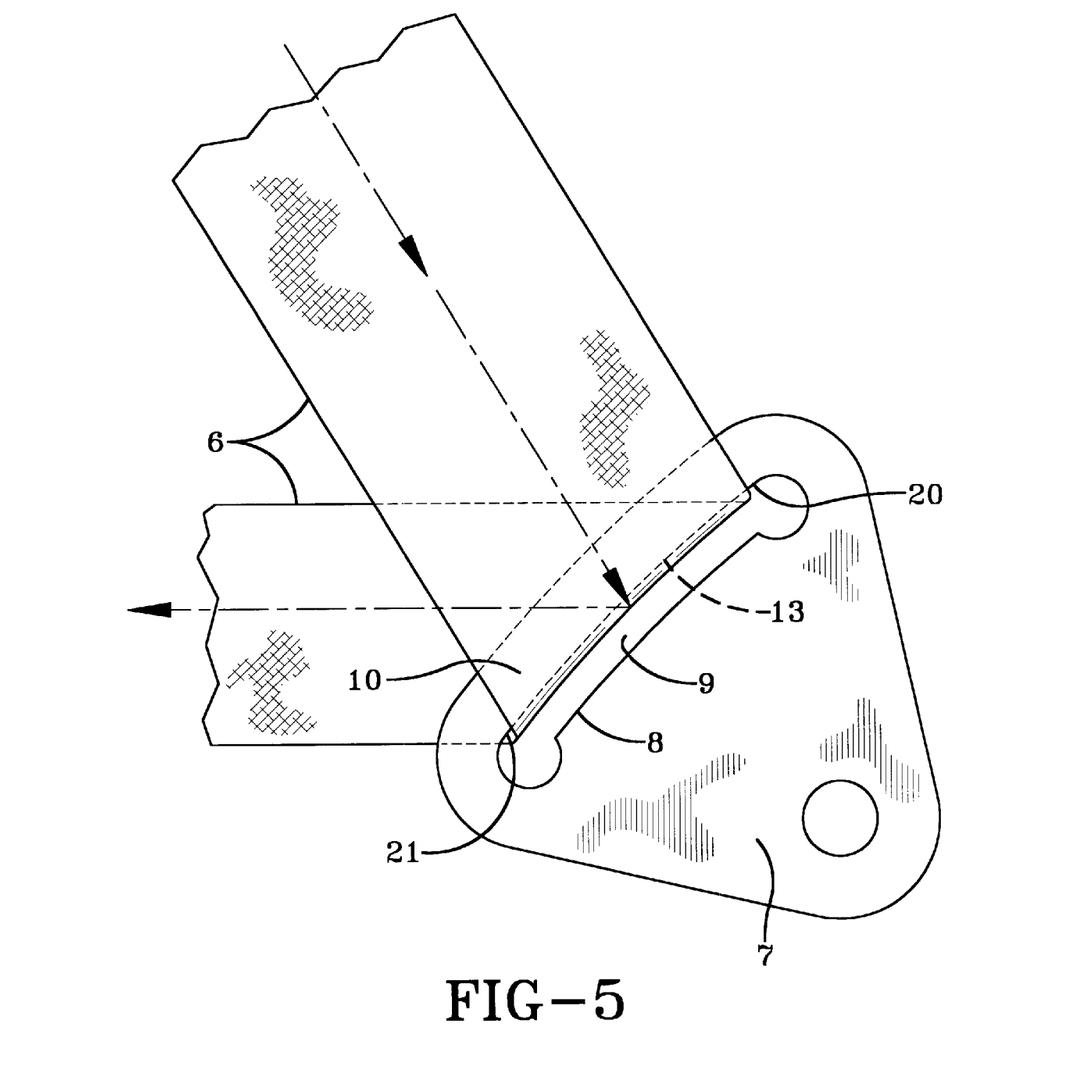
FIG. 5 is a fragmentary view of a lap belt webbing part guided through the belt webbing guide secured to the seat substructure.

The embodiments for three-point seat belt systems shown in FIGS. 1 to 4 are provided on a front seat 1 of a motor vehicle. Part of a lap belt 2 is shown. From the lap belt 2, a belt webbing part 6 is guided through a belt webbing guide 7 fastened to the seat substructure 4. The belt webbing guide 7 has a belt slot 8 through which the belt webbing part 6 is guided. As shown in FIG. 5, the belt webbing guide 7 has a flexible bar 10 with a curved guiding surface 13, also shown in FIGS. 6 to 8, around which around which the part 6 of the belt webbing engaged by a belt tightening drive 3 is directed. In FIGS. 1 to 4, the belt webbing part 6 extending from the lap belt 2 is, after being redirected by the belt belt guide 7, extending towards a belt tightening drive 3, which in the represented embodiments is a linear belt tightener. The linear belt tightening drive can in a conventional manner comprise a piston, with which a drive element, such as a traction cable, engaging the belt webbing, is connected. The piston is guided in a cylinder by a preferably pyrotechnic drive in an axial direction and thereby produces a tightening force that is transmitted to the belt webbing part that is guided through the belt webbing guide.

The belt webbing part 6 is securely connected to a drive element 5, for instance a traction cable of the belt tightening drive 3. The drive element is connected to a piston guided in a guide cylinder of the belt tightening drive 3 and may be pyrotechnically driven. A belt tightening drive of this type is known for example, from U.S. Pat. No. 5,519,997. In the embodiments represented in FIGS. 1 to 4, the belt webbing guide 7 is located in the region of the seat substructure where the seat surface and the back rest meet. The belt webbing guide is fastened to the seat substructure 4 in a stationary manner, so that the guiding surface 13 assumes a predetermined orientation with regard to the belt webbing part 6 guided to the belt tightening drive 3. A redirecting line represented by dashed arrows in FIG. 5 coincident with a center line of the guiding surface 13, represents a fixed predetermined angle with regard to the belt tightening direction. This redirecting line, or the guiding surface, is oriented such that the belt webbing is guided through the belt slot 8 of the belt webbing guide. As shown in FIG. 5, this angle is approximately 45° with the apex of the angle being at about the guiding surface 13. The lower, approximately horizontally guided web part in FIG. 5 is extending towards the belt tightening drive 3, as indicated by the arrow pointing to the left in the drawing. The web part extending obliquely from above derives from the lap belt 2, as indicated by the arrow pointing obliquely downwards in the drawing. The orientation of the guiding surface 13, as represented in FIG. 5, with regard to the web movement direction of the belt webbing guided to the belt tightening drive 3 is dimensioned in such a way that the belt webbing part 6 is guided essentially centrally through the belt slot 8 of the belt webbing guide 7 without any lateral displacement during the belt tightening process,.

Figure 1:
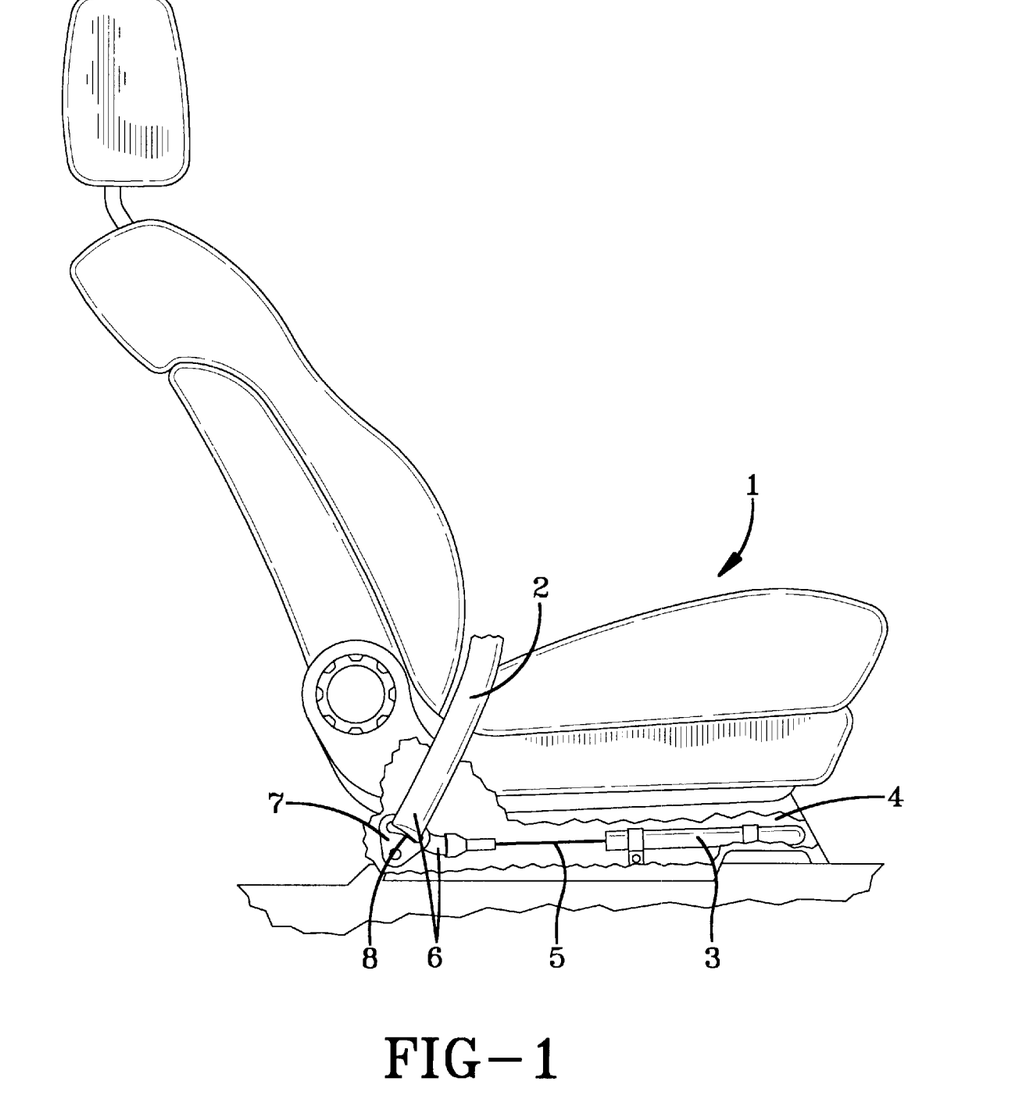
FIG. 1 shows a first embodiment of the invention with a linear belt tightening drive that extends substantially parallel to the upper seat slide.
Figure 2:
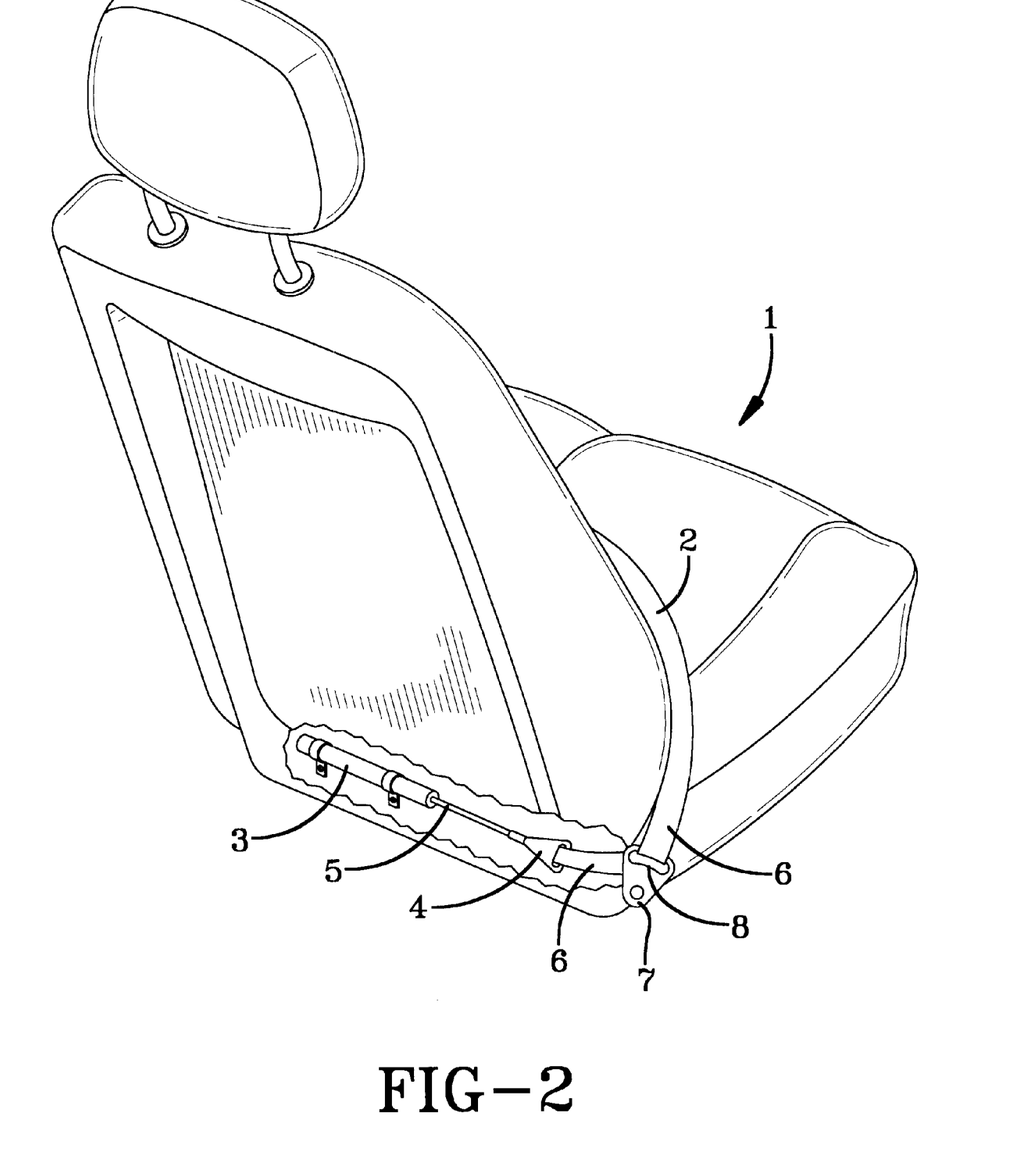
FIG. 2 shows a second embodiment wherein the linear belt tightening drive is arranged transversely to the direction of seat travel in the rear of the seat substructure.
Figure 3:
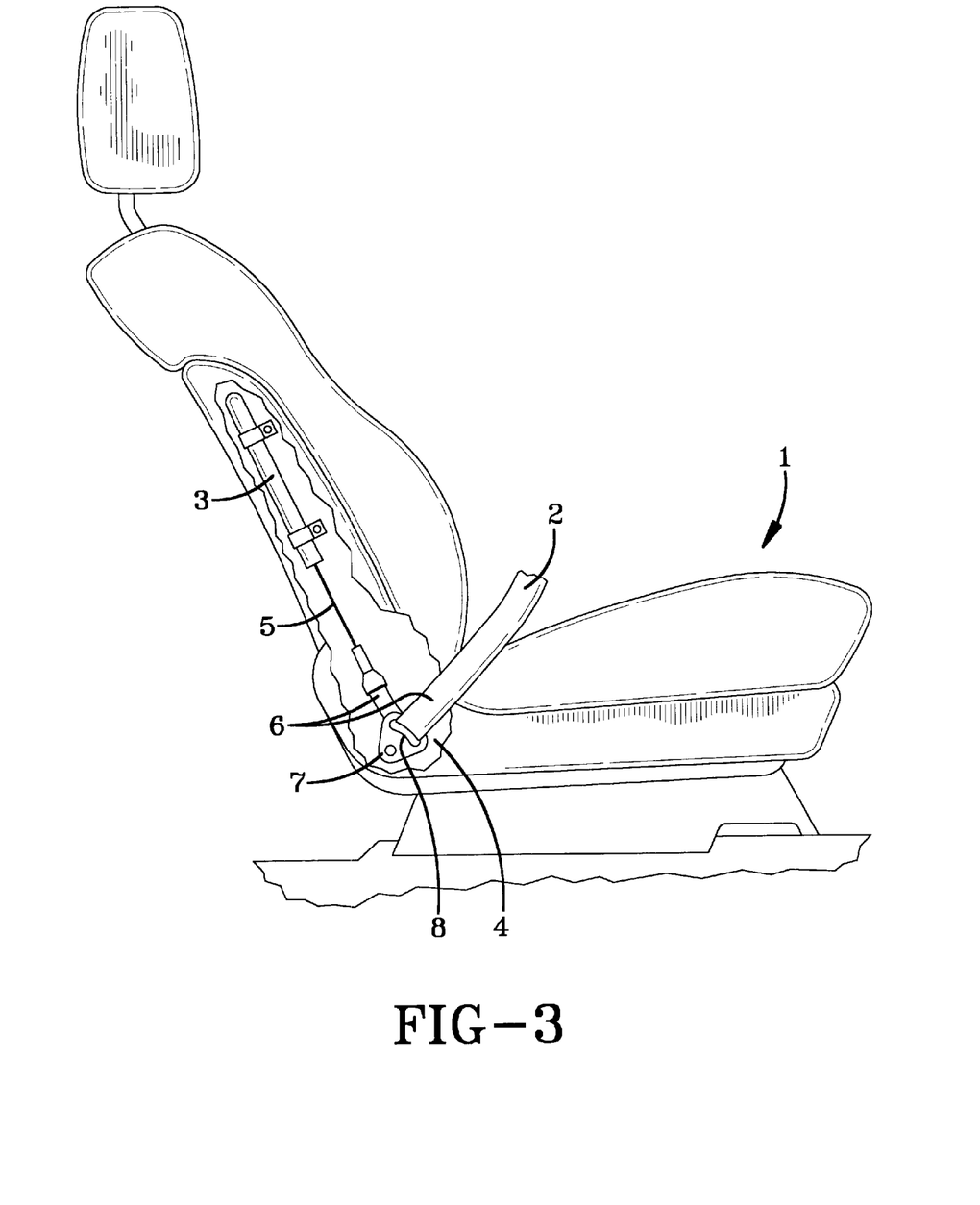
FIG. 3 shows a third embodiment of the invention wherein the linear belt tightening drive is arranged laterally in the backrest.
Figure 4:
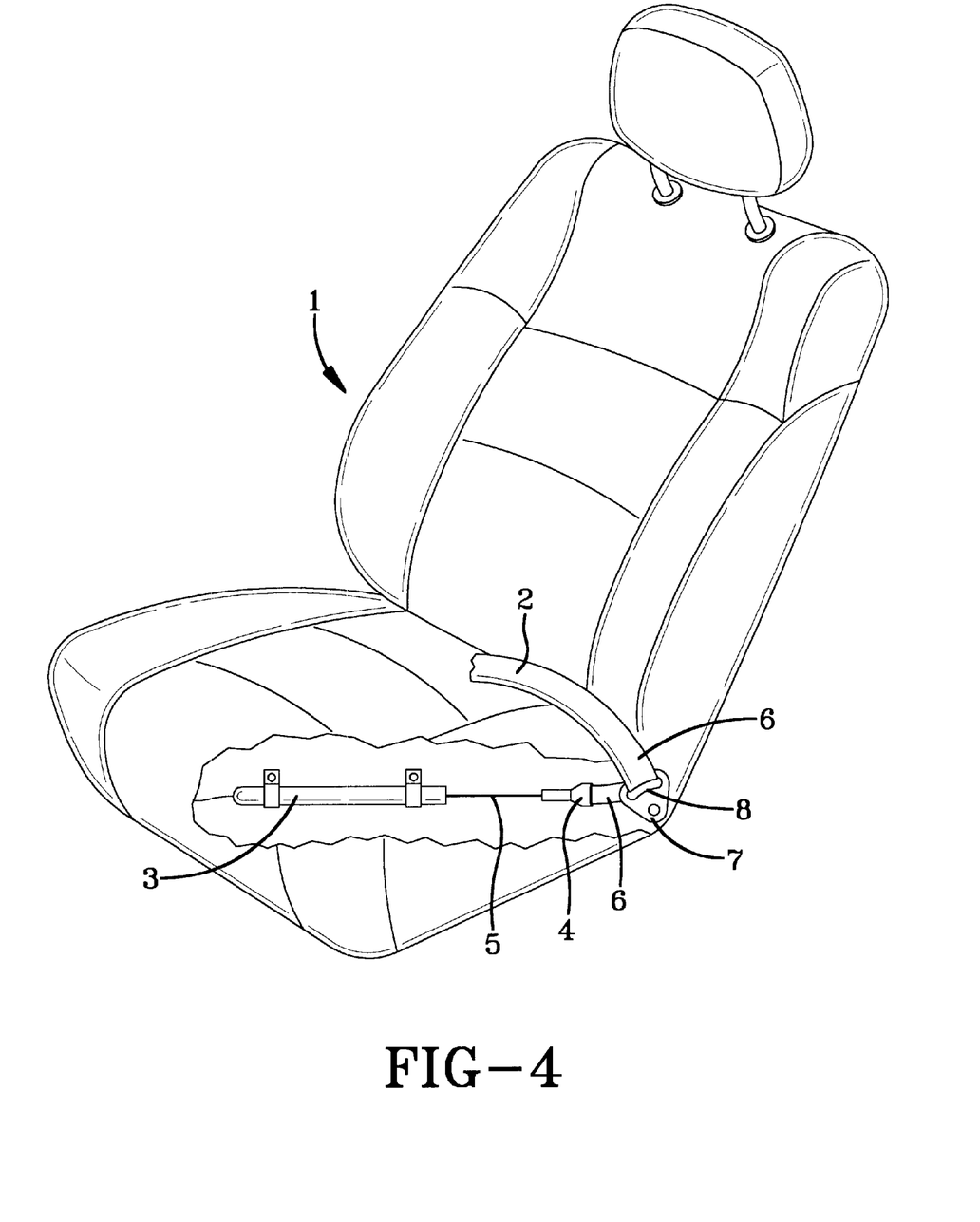
FIG. 4 shows a fourth embodiment of the invention wherein the linear belt tightening drive is arranged diagonally in the seat substructure.

In the embodiment shown in FIG. 1, the belt tightening direction is essentially parallel to the forward direction of travel of the vehicle, or parallel to the upper seat slide of the seat substructure 4. The guide tube of the linear belt tightener 3 extends essentially parallel thereto and is fastened to the seat substructure 4. In the embodiment represented in FIG. 2, the belt tightening drive 3 is fastened to a rear side of the seat substructure 4 at essentially transverse to the direction of travel of the vehicle. The movement of the drive element 5, for example a traction cable, and thus the tightening pulling direction, which is exercised on the belt webbing part 6, also runs perpendicular to the longitudinal axis of the vehicle. In the embodiment shown in FIG. 3, the belt tightening drive 3 is arranged substantially vertically in the back rest of the motor vehicle front seat 1, so that the tightening pulling direction runs essentially parallel to the back rest of the vehicle seat. In the embodiment shown in FIG. 4, the belt tightening drive 3 is fastened diagonally to the seat substructure, as seen in a top view. Accordingly, the drive element 5 is a traction cable and the tightening pulling force exercised on the directed belt webbing part 6 run in this direction.

The belt webbing guide 7 is located on one side of the motor vehicle front seat 1, preferably in close proximity to the vehicle door sill. On the other side of the seat there is provided in a known manner a buckle, that is not shown, to which the lap belt 2 is guided. The belt buckle can be connected to the belt tightening drive in a known manner. It is not required, however, to connect the belt buckle with a tightening drive, since due to the belt tightening drive of the invention in combination with the belt webbing guide, tightening lengths of up to 200 mm can be achieved. It is therefore not required to also tighten the belt buckle so that a required impact resistance of the belt buckle with regard to tightening and hence additional expenditure to the belt buckle can be omitted. The belt buckle can be a rigid restraint element or as an anchoring point of the three-point seat belt system that is rigidly connected to the vehicle seat or vehicle structure. The tightening effect produced by the belt tightening drive 3 is transferred directly to the lap belt 2. The tightening length immediately affects the lap belt 2. This way, at an early stage of the crash, a secure restraint of the seat belt-wearing vehicle occupant in the motor vehicle front seat is achieved.

To maintain the tautly tightened lap belt after the tightening process, a fastening device 9 is provided in the region of the belt slot 8. The width of the belt slot 8 can be reduced to the thickness of the belt webbing by a fastening device 9 or clamping device 11, so that the belt guide is secured against misuse, for instance by children playing with the lap belt webbing. The fastening device is designed such that in the retensioning direction the pulling effect of by the belt tightening drive on the belt webbing can be transferred essentially without impediment. A movement in a direction opposite the retensioning direction is blocked by the fastening device, at least during normal operation.

Figure 6:
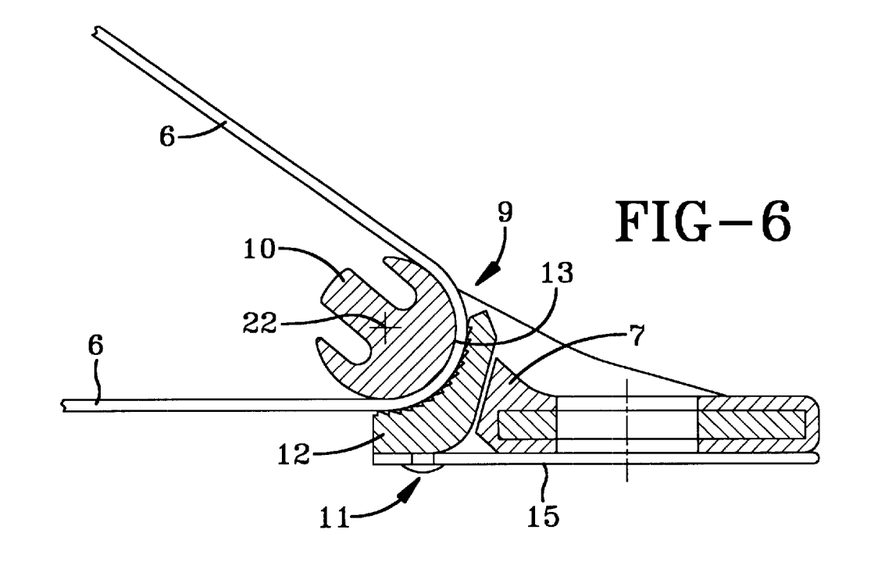
FIG. 6 shows a clamping device that during normal operation holds the belt webbing in first position and after the tightening blocks the belt webbing in the web extraction direction.
Figure 7:
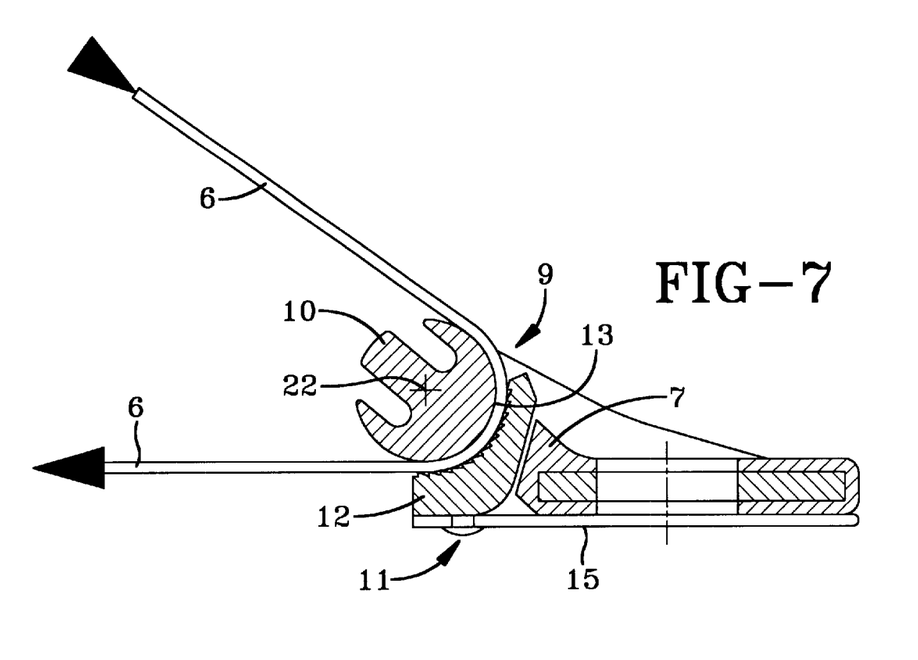
FIG. 7 shows the clamping device of FIG. 6 during the belt tightening process.
Figure 8:
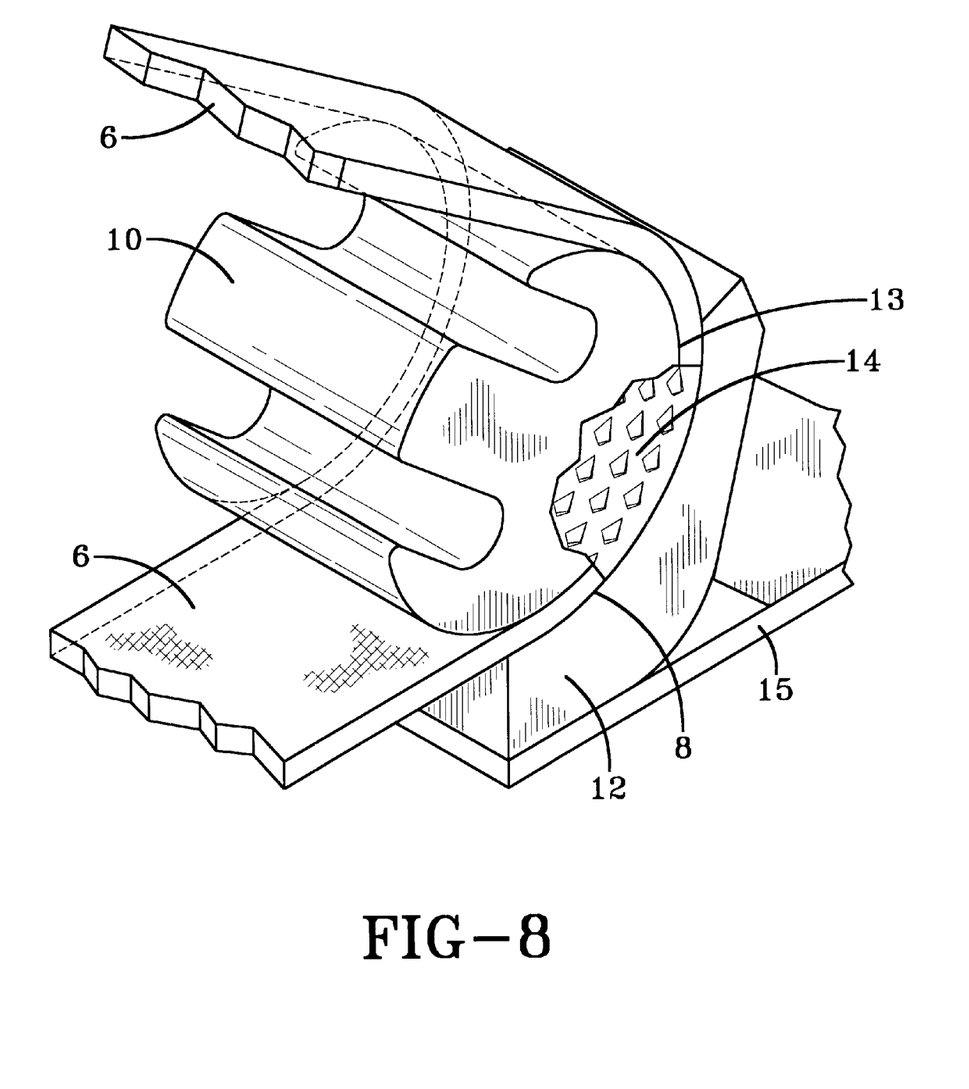
FIG. 8 is a perspective view of the clamping device of FIGS. 6 and 7.
Figure 9:
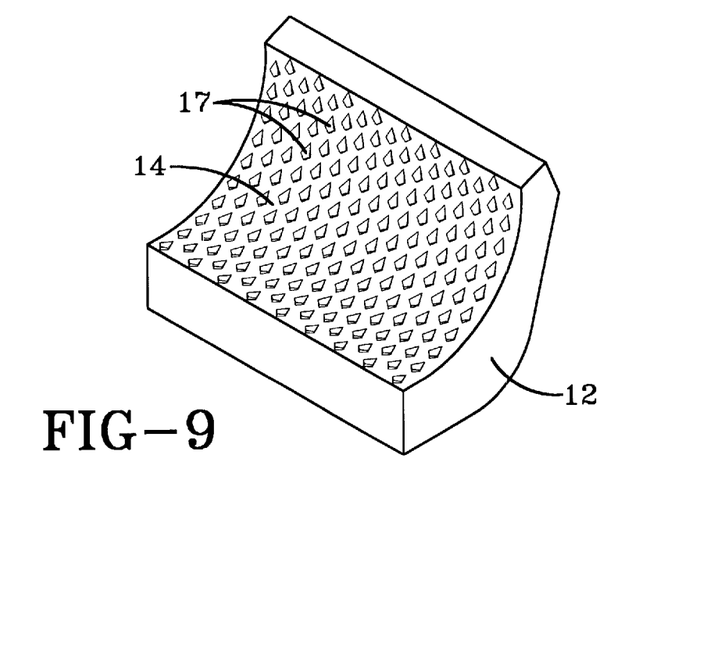
FIG. 9 is a perspective view of a clamping surface on a clamping jaw of the clamping device of FIGS. 6 to 8.
Figure 10:
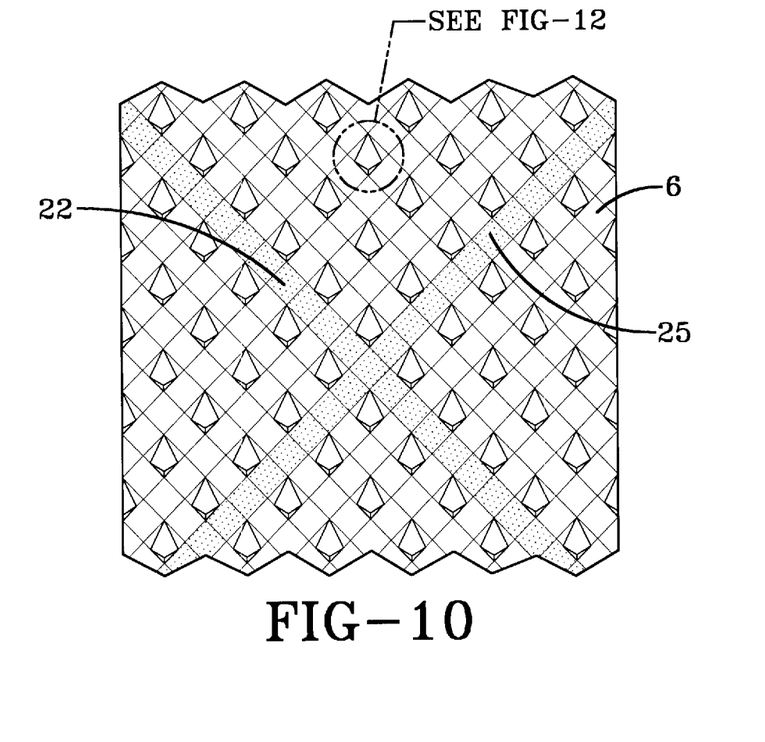
FIG. 10 is a top view of the arrangement of teeth on the clamping surface of the clamping jaw represented in FIG. 9.

FIGS. 5 to 14 show embodiments of fastening devices. In the embodiment of FIGS. 6 to 12, the fastening device 9 is a clamping device 11. The clamping device comprises a clamping jaw 12 with a clamping surface 14 having a curvature that is complementary to the curvature of the guiding surface 13 on the flexible bar 10. The guiding surface 13 and the clamping surface 14 are substantially cylindrical surfaces running parallel to one another around a common guiding surface axis 22. FIG. 10 is a top view of the arrangement of teeth on the clamping surface of the clamping jaw represented in FIG. 9, with the arrangement of the fabric structure of the belt webbing, which is guided through the webbing guide, with regard to the middle axis of the flexible bar, with an enlarged representation of a tooth as seen in a top view. The clamping surface 14 is provided with locking teeth 17, the shape and arrangement of which is complementary to the fabric structure of the belt webbing, as shown in FIG. 10. As shown in FIGS. 6 to 8, during the redirection the belt webbing part 6 is guided between the clamping surface 14 on the clamping jaw 12 and the guiding surface 14 on the flexible bar 10. Between these two surfaces the belt slot 8 is formed in the belt webbing guide 7. The guiding surface 13 and the clamping surface 14 have curvatures complementary to one another and run parallel to one another. The clamping jaw 12 is pressed on the surface of the directed belt webbing part 6 with spring pretension, provided by the spring 15.

Figure 11:
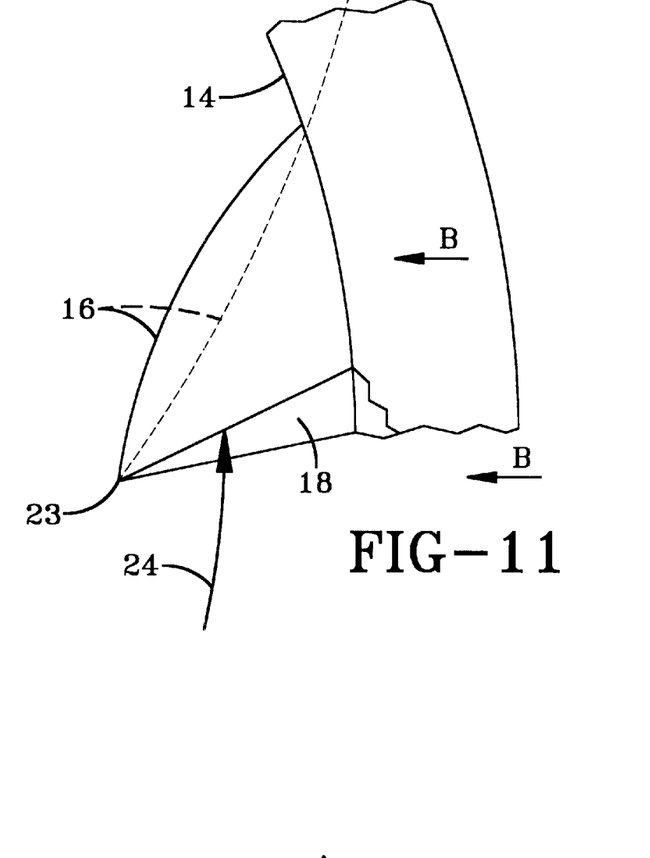
FIG. 11 is an enlarged representation of a tooth provided on the clamping surface.

FIG. 11 is a detailed representation of a tooth 17. The teeth 17 on the clamping surface 14, shown in FIG. 9, comprise a flank 16 ascending in the tightening pulling direction, which can be concave (continuous line) or convex (dotted line). The flanks 16 of the teeth 17 provided on the clamping surface 14 provide a sliding surface over which, during the tightening of the belt webbing, the belt webbing part 6 directed in the belt slot 8 slides without impediment. When after the tightening process, due to the forward displacement of the seat belt-wearing vehicle occupant, a force is exercised on the belt webbing part 6 guided through the belt slot 8 against the tightening pulling direction in the belt web extraction direction, and the belt webbing part 6 is marginally moved in this direction, an engagement of the teeth 17 in the fabric structure of the belt webbing part 6 in the region of the entire belt slot 8 takes place. Due to the multitude of teeth engaging the fabric structure, the load acting upon the belt webbing is rather transferred like from a pressure surface to the belt webbing guide acting as an end fitting. During normal operation, the clamping jaw is forced on the belt webbing part guided through the belt slot with preferably spring pretensioning. The automatic tooth engagement for the blocking of the web extraction against the tightening pulling direction is further supported this way.

The retensioning results in a very tautly tightened lap belt and in addition a shortening of the chest belt that is guided from the insertion tongue locked in the belt buckle to the belt guide or anchoring point anchored to the top end of the B-pillar. Due to the very tautly tightened lap belt, knee injuries in particular, caused by the forward displacement of the vehicle occupant, are avoided. This can render an additional knee airbag superfluous in the vehicle.

Figure 12:
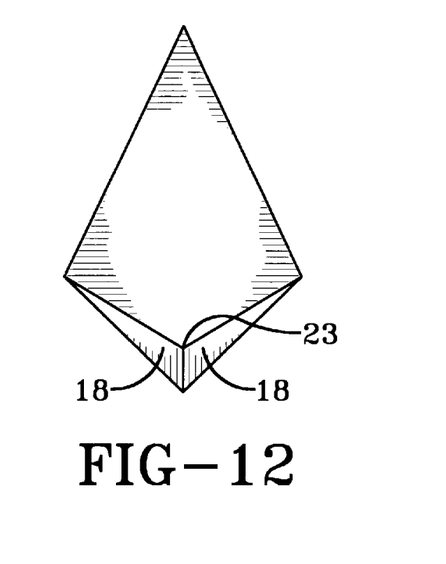
FIG. 12 shows a tooth in viewed in direction indicated by the arrows B in FIG. 11.

The fastening device can be designed such that after the tightening of the seat belt, it blocks a web extraction movement, which occurs against the tightening pulling direction, in the region of the belt slot. To this effect the teeth 17 comprise engaging flanks 18, extending against the belt web extraction direction and arranged at an approximate right angle to one another, as shown in FIGS. 11 and 12. The arrangement of the teeth 17 on the clamping surface 14 corresponds to the oblique or diagonal course of the fabric structure of the belt webbing part 6 guided through the belt slot 8, as shown in FIG. 10. In FIGS. 9 and 10, this oblique course or the thereto adapted oblique arrangement of the teeth 17 on the clamping surface 14 is shown. The direction of the engaging flanks 18 and the height and dimensions of the engaging flanks 18 correspond to the fabric structure of the seat belt webbing so that the engaging flanks are in engagement on the belt webbing fabric surfaces 24, 26 which run at an essentially right angle to one another, as shown in FIG. 10. Both engagement flanks 18 run obliquely to the clamping surface 14, so that they exercise a hook effect on the web in the web extraction direction, that is to say against the tightening pulling direction. At the tip 23, the engagement surfaces 18 converge with the sliding flank 16, whereby said tip is extending against the belt web extraction direction. A hook locking is thus achieved, when the belt webbing moves in the web extraction direction, as indicated by the arrow 24 in FIG. 11. The quasi-surface engagement, which is achieved through the multitude of engagement flanks 18, prevents the seat belt webbing from being held or blocked in the belt slot in the web extraction direction in an undamaged manner. The belt webbing guide 7 acts like an end fitting of the seat belt securely fastened to the vehicle structure or the seat substructure 4.

The pretension of the spring 15 ensures that after the belt tightening, in one pulling motion, on the belt webbing part 6 and in the web extraction direction, that is against the arrows shown in FIG. 7, the teeth 17 on the clamping surface 14 automatically engage the fabric structure of the belt webbing part guided diagonally through the belt slot 8, as shown in FIG. 10. This ensures that during normal operation the belt webbing of the seat belt is held in a first position. The belt slot 8 is furthermore essentially reduced to the thickness of the seat belt by the clamping jaw 12 to protect against misuse.

Figure 13:
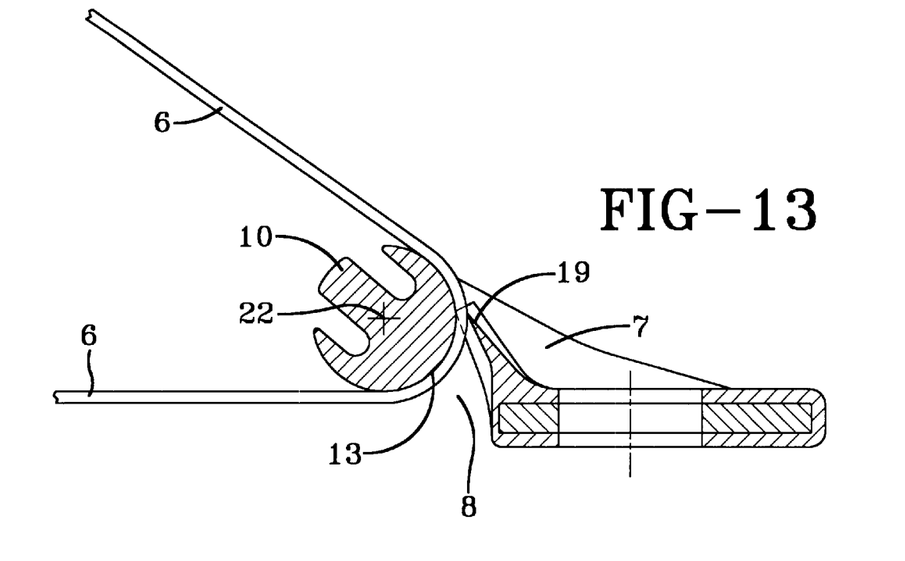
FIG. 13 shows a further embodiment of the fastening device during normal operation.
Figure 14:
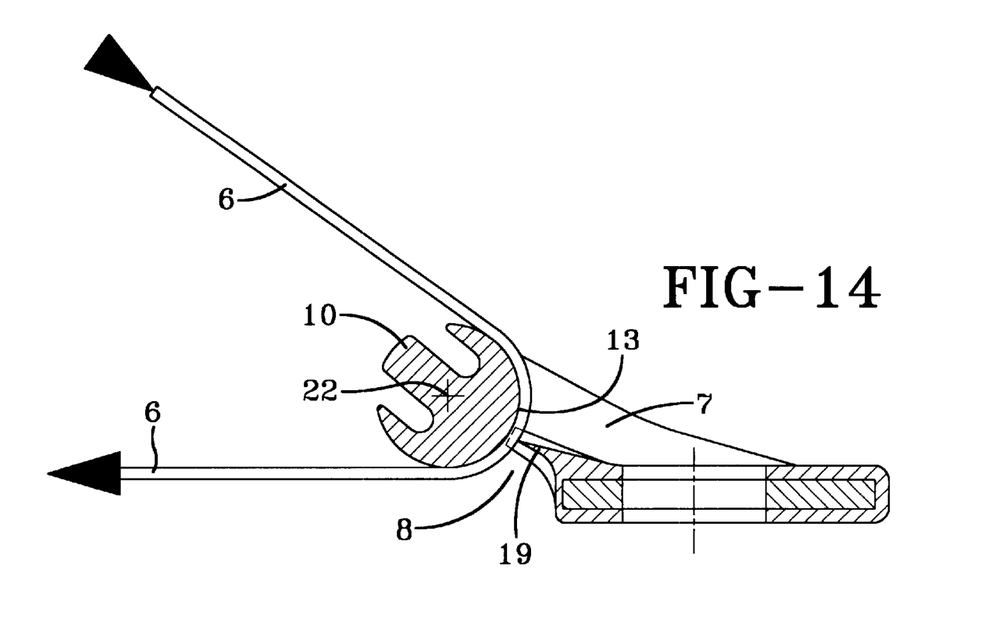
FIG. 14 shows the embodiment represented in FIG. 14 during the tightening of the seat belt.

In the embodiment shown in FIGS. 13 and 14, the fastening device 9 is a fastening lip 19. In FIG. 13 the positioning of the fastening lip 19 during normal driving operation is shown. Due to the fastening lip the zero positioning of the seat belt is determined during normal driving operation. To this effect the belt webbing part 6 supported on the guiding surface 13 is pressed by the fastening lip 19. As shown in FIG. 14, during the tightening of the seat belt, the fastening lip, which displays a certain elasticity, is moved along with the belt webbing part 6 moved over the guiding surface 13 and is pulled over to the other side of the belt slot 8.

In FIG. 5, the fastening device, which in the embodiment of FIGS. 6 to 14 is formed by the clamping device 11 or the clamping jaw 12 and in the embodiment of FIGS. 13 and 14 by the fastening lip 19, can be provided with lateral guide projections 20, 21, the height of which corresponds approximately to the thickness of the belt webbing. During the tightening of the seat belt, as shown in FIGS. 7 and 12, both longitudinal edges of the belt webbing part 6 are guided along these guide projections. This ensures that the belt webbing part 6 guided through the belt slot 8 retains its central position during the tightening process.

The invention has been described in the above embodiments in such a way that the belt webbing guide and the belt tightening drive are arranged on the vehicle front seat. It is also possible, however, to fasten the belt webbing guide 7 to the car body, for instance to the bottom part of the B-pillar or the door sill of the vehicle. The can also be fastened to an appropriate point, for instance on the door sill. In connection with the clamping device described in FIGS. 5 to 12, the same effect is achieved as described above.

In this case the load acting upon the seat belt during the forward displacement of the seat belt-wearing vehicle occupant is essentially completely taken up by the belt webbing guide. The belt webbing guide thus acts like an end fitting. The belt tightening drive can then be fastened by a reduced load-carrying fastening, for instance of approximately 5 kN, in the seat substructure or else to another seat part, e.g. the backrest. In addition it is no longer required to provide the belt tightening drive with a reverse movement lock.

While preferred embodiments of the invention have been shown and described, it will be apparent to those skilled in the art that changes may be made thereto without departing from the spirit or scope of the invention. Accordingly the invention is intended to be limited only by the appended claims.

What is claimed is:

1. A three-point seat belt system for a motor vehicle seat comprising a belt tightening drive that is fastened to a vehicle seat and is adapted to tighten a seat belt in a belt tightening pulling direction during a crash, the belt tightening drive engages an anchoring point of the seat belt, wherein a drive element of the belt tightening drive is securely connected to a belt webbing part that is guided from a lap belt through a belt webbing guide fastened to a seat substructure, wherein the belt webbing guide comprises a fastening device and a flexible bar which delimits a belt slot of the guide, the belt webbing part is guided through the belt slot, and the belt webbing part is pressed by the fastening device on the flexible bar of the guide so that a movement of the lap belt in a direction opposite the belt tightening direction is blocked by the fastening device.

2. The three-point seat belt system of claim 1 wherein the belt tightening drive is a linear belt tightener.

3. The three-point seat belt system of claim 1 wherein the drive element is connected to an end of the belt webbing part that is guided through the belt webbing guide.

4. The three-point seat belt system of claim 2 wherein the drive element is securely connected to the end of the belt webbing part that is guided through the belt webbing guide.

5. The three-point seat belt system of claim 1 wherein the belt webbing guide is secured to a side of the seat substructure that is opposite the seat side where a belt buckle is located.

6. The three-point seat belt system of claim 1 wherein the belt webbing guide is fastened to a substructure of the seat in a region where a backrest and a seat surface meet.

7. The three-point seat belt system of claim 1 wherein the belt webbing guide is fixed to the seat substructure so that a guiding surface, around which the belt webbing part guided through the belt webbing guide is guided, assumes with regard to the tightening pulling direction, a fixed predetermined angle.

8. The three-point seat belt system of claim 1 further comprising lateral guide projections provided on the fastening device.

9. The three-point seat belt system of claim 1 wherein the fastening device comprises a clamping jaw with a clamping surface abutting the belt webbing part positioned in the belt slot.

10. The three-point seat belt system of claim 9 wherein the belt slot is formed between a guiding surface of the flexible bar and the clamping surface of the clamping jaw.

11. The three-point seat belt system of claim 9 wherein the clamping surface is provided with teeth.

* * * * *